United States Patent [19]

More et al.

[11] Patent Number: 5,490,162
[45] Date of Patent: Feb. 6, 1996

[54] PROCESS AND DEVICE FOR THE CONTINUOUS TREATMENT OF SILICON

[75] Inventors: Anton More, Marienbergerstr. 48 c, D-84489 Burghausen; Karl Hutzler, Burghausen; Rudolf Koch, Kirchdorf, all of Germany

[73] Assignee: Anton More, Germany

[21] Appl. No.: 170,330

[22] PCT Filed: Jun. 26, 1992

[86] PCT No.: PCT/DE92/00526

§ 371 Date: Jan. 3, 1994

§ 102(e) Date: Jan. 3, 1994

[87] PCT Pub. No.: WO93/01131

PCT Pub. Date: Jan. 21, 1993

[30] Foreign Application Priority Data

Jul. 4, 1991 [DE] Germany ............ 41 22 190.7

[51] Int. Cl.⁶ ........................ C03B 3/00
[52] U.S. Cl. ............. 373/33; 373/27; 373/84; 75/10.47
[58] Field of Search ............ 373/27–35, 79, 373/84, 115, 143; 75/10.47, 10.35, 255; 425/7; 419/38; 556/472

[56] References Cited

U.S. PATENT DOCUMENTS

| | | | |
|---|---|---|---|
| 2,967,351 | 1/1961 | Roberts et al. | 419/38 |
| 4,284,393 | 8/1981 | Brunosson et al. | 425/7 |
| 4,375,449 | 3/1983 | Siddall | 373/33 |
| 4,433,421 | 2/1984 | Wooding | 373/79 |
| 4,532,090 | 7/1985 | Dietze et al. | |
| 4,534,791 | 8/1985 | More et al. | 75/10.47 |
| 4,895,969 | 1/1990 | Feldner et al. | 556/472 |

FOREIGN PATENT DOCUMENTS

| | | | |
|---|---|---|---|
| 913729 | 6/1954 | Germany. | |
| 3223821 | 12/1983 | Germany. | |
| 3331046 | 3/1985 | Germany. | |
| 3342496 | 6/1985 | Germany. | |
| 3610257 | 10/1987 | Germany. | |
| 3823308 | 7/1988 | Germany | 556/472 |
| 665976 | 6/1988 | Switzerland. | |
| 2051882 | 1/1981 | United Kingdom. | |

OTHER PUBLICATIONS

IBM Technical Disclosure Bulletin, vol. 18, No. 12, May 1976, New York US, p. 4059, A. Bohg et al. "Manufacture of ultrapure silicon powder".

Primary Examiner—Tu Hoang
Attorney, Agent, or Firm—Davis, Bujold & Streck

[57] ABSTRACT

The invention relates to a process for the continuous treatment of silicon in which a slag in a pivotable low-shaft furnace (1) with a discharge pipe (4) reaching the bottom of the furnace tank is taken to a temperature of 1450° to 1800° C. and this slag is used to melt solid silicon and/or liquid silicon is continuously refined and the liquid refined silicon is then sprayed with compressed air or nitrogen (7) and continuously conveyed into a transport crucible (11) by being poured into a stream of water (9) in the channel (8) via a dewatering filter (10) and thus obtained in granular form. The invention also relates to devices for implementing the process.

12 Claims, 2 Drawing Sheets

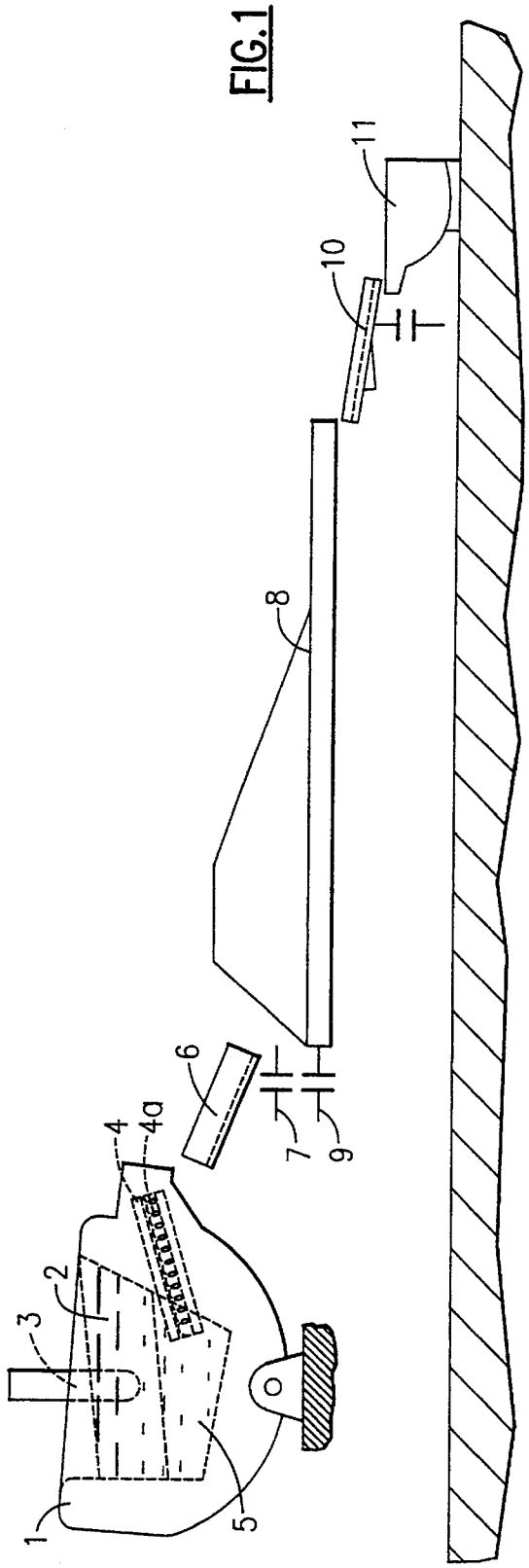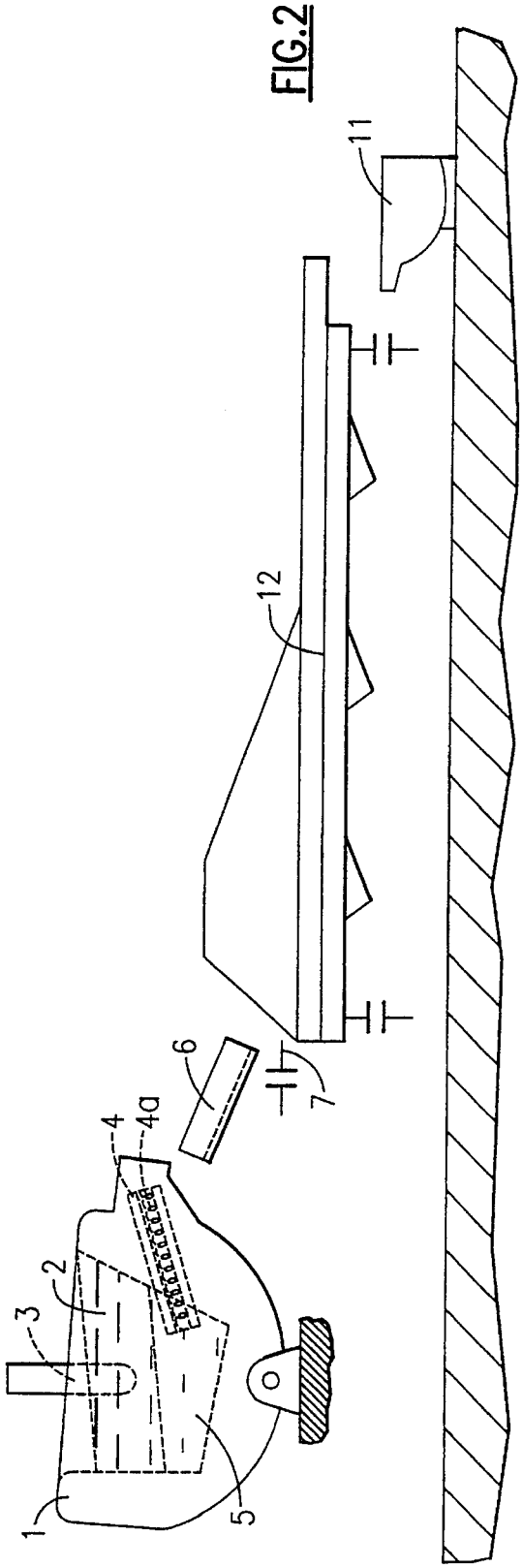

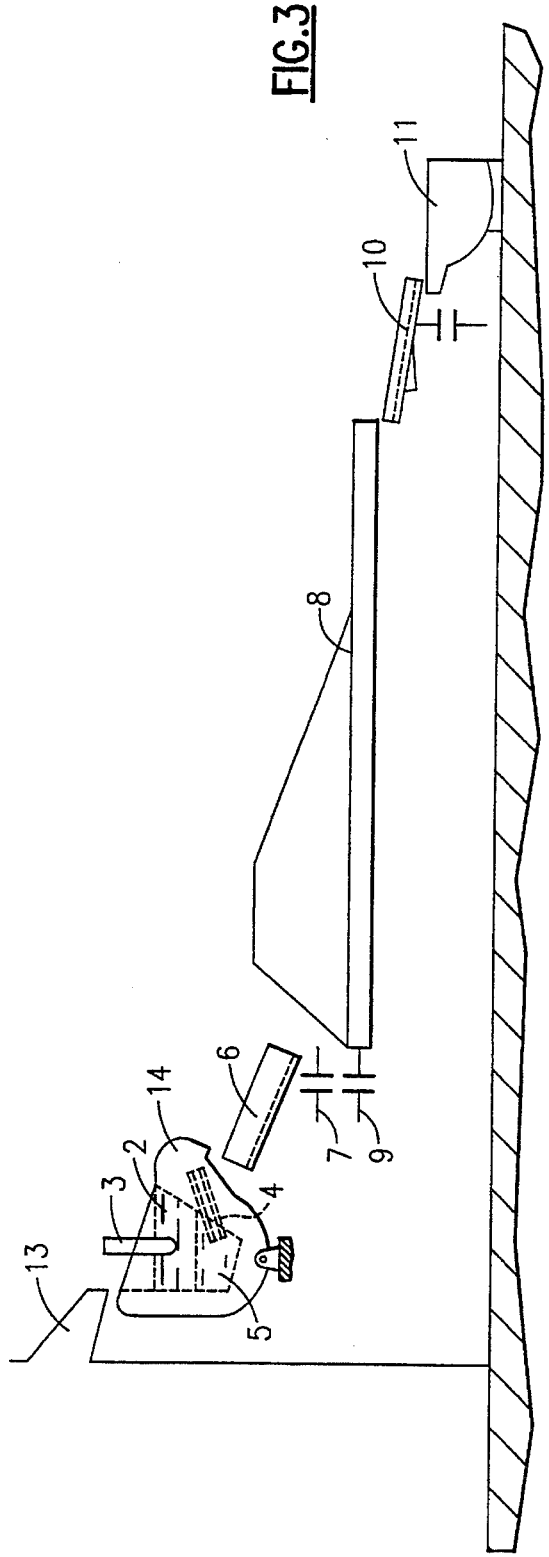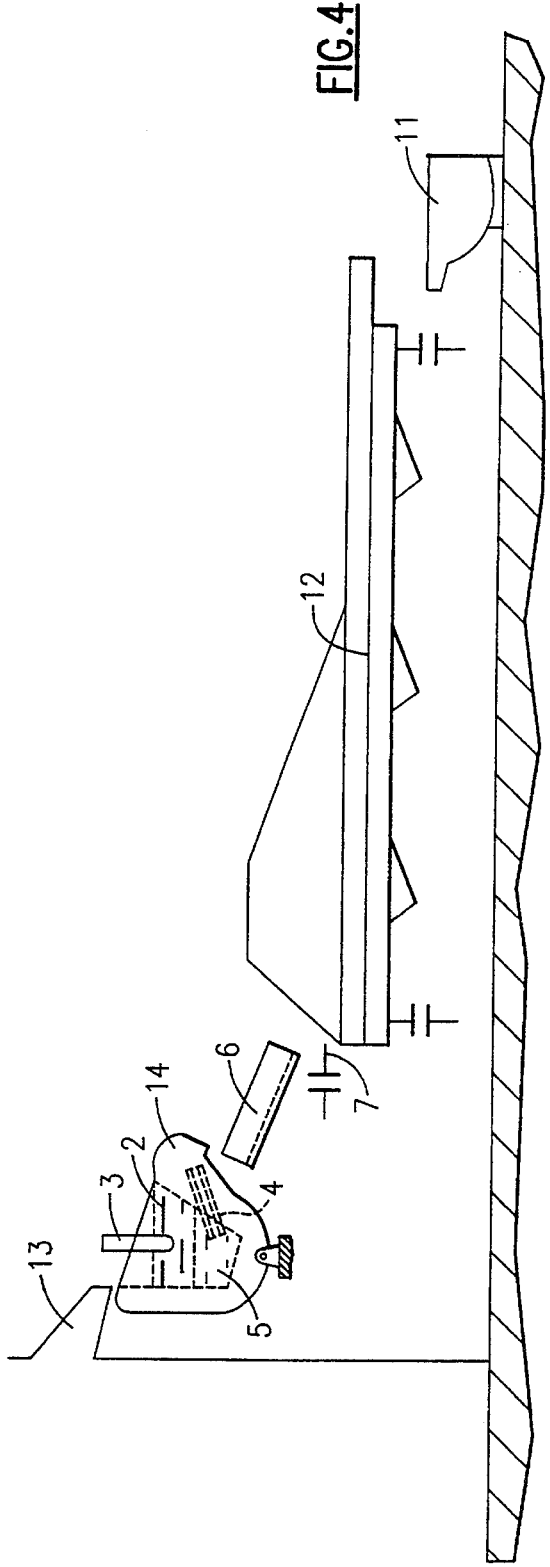

PROCESS AND DEVICE FOR THE CONTINUOUS TREATMENT OF SILICON

FIELD OF THE INVENTION

The present invention relates to a process and an apparatus for continuous treatment of silicon.

BACKGROUND OF THE INVENTION

Patent print DE-A1 3331046 describes a process for treating silicon and ferrosilicon with slag. In this process a silicate smelt with the composition

| | |
|---|---|
| $K_2O$ | 2 to 13% by weight |
| $Na_2O$ | 0 to 2% by weight |
| $\Sigma K_2O + Na_2O$ | 2 to 13% by weight |
| $SiO_2$ | 45 to 72% by weight |
| $Al_2O_3$ | 0 to 30% by weight |
| $\Sigma SiO_2 + Al_2O_3$ | 60 to 78% by weight |
| $CaO$ | 0 to 30% by weight |
| $MgO$ | 0 to 30% by weight |
| $\Sigma CaO + MgO$ | 15 to 30% by weight |
| $CaF_2$ | 0 to 10% by weight |
| $MgF_2$ | 0 to 10% by weight |
| $\Sigma CaF_2 + MgF_2$ | 0 to 10% by weight |
| $\Sigma CaO + MgO + CaF_2 + MgF_2$ | 15 to 30% by weight | and impurities due to the raw materials, is smelted and overheated in a resistance furnace. Solid, preferably low-grade, dusty silicon or silicon waste is fed into this silicate smelt. At the end of the melt-down or refining process the silicon is tapped. The silicon thus obtained can be processed like lumpy silicon produced by smelting metallurgy.

This process works by batch processing. This has the disadvantage that the furnace charge comprising slag and melted-down silicon must be greatly overheated before tapping so that a high yield of silicon can be obtained. Unless previously overheated the furnace cools down during the following charging of silicon or silicon dust to such an extent that silicon dust slags and yield is lost or the melt-down slag becomes useless prematurely.

A further disadvantage of this process is that from tap to tap the discharge must be burned out. This detracts from smelting time. Pour-out time is also lost for the melt-down process. A further time loss is caused by the charging of the silicon or silicon dust. Cooling of the slag by the cold silicon reduces the furnace efficiency by up to one half for a period of about ¼ hour to ½ hour.

When liquid silicon is not smelted from silicon dust or waste silicon but produced by the customary carbothermic reduction process it must be subjected after tapping to an elaborate refining process in a ladle to obtain the necessary purity of so-called chemical qualities. In the refining processes currently employed here, oxygen or oxygen/nitrogen mixtures are top-blown onto the silicon in the tapping receiver or blown through the silicon smelt to oxidize aluminum and calcium. The resulting losses due to combustion, slagging and splashing are up to 15% of the weight of the tapped silicon. After being refined the silicon is poured into tubs like the silicon melted-down from dust or waste.

For carrying off the resulting large silicon plates or the tundish filled with silicon to the crushing plant one requires heavy loading machines or high-lift trucks. For coarse-crushing the silicon plates or blocks, which are up to 500 mm thick, one requires several large crushers arranged in tandem. The processing of the large-sized silicon is thus very costly and labor-intensive.

Laid-open print DE 36 10 257 describes a process for granulating slags and molten baths such as silicon to obtain foamed slag or granular material as large-sized as possible. This process is problematic for producing granular silicon since hydrogen explosions can occur as soon as the ratio of the amount of poured-in silicon to the amount of water used is not right or the temperature of the poured-in silicon is too high. Large amounts of hydrogen then develop immediately, involving the danger of an oxyhydrogen explosion.

The invention is based on the problem of providing a continuous process for smelting and/or refining and for continuously pouring and coarse-crushing silicon which avoids the disadvantages of the prior art, and an apparatus for carrying out this process.

SUMMARY OF THE INVENTION

The other part of the problem is solved by a tilting electrically heated low-shaft furnace having a discharge pipe, and an apparatus for continuously pouring or granulating silicon comprising a launder for collecting the silicon emerging from the furnace and retaining any entrained slag, optionally nozzles for spraying the liquid silicon, and troughs for carrying off or cooling the liquid or solidified silicon.

The inventive process uses a slag like the known process of DE 333 10 46 A1. The slag suitable for the inventive process has the following composition:

| | |
|---|---|
| $K_2O$ | 0 to 15% by weight |
| $Na_2O$ | 0 to 10% by weight |
| $\Sigma K_2O + Na_2O$ | 2 to 15% by weight |
| $SiO_2$ | 55 to 72% by weight |
| $Al_2O_3$ | 0 to 15% by weight |
| $\Sigma SiO_2 + Al_2O_3$ | 60 to 78% by weight |
| $CaO$ | 0 to 35% by weight |
| $MgO$ | 0 to 35% by weight |
| $\Sigma CaO + MgO$ | 15 to 35% by weight |
| $CaF_2$ | 0 to 8% by weight |
| $MgF_2$ | 0 to 8% by weight |
| $\Sigma CaF_2 + MgF_2$ | 0 to 8% by weight |
| $\Sigma CaO + MgO + CaF_2 + MgF_2$ | 15 to 30% by weight | and impurities due to the raw materials.

The totals stated above are conditions which restrict the free selection of the single components. The proportion of impurities due to the raw materials is generally in the range of 0.1 to 1.5% by weight. All percentages by weight add up to 100% by weight in each special slag composition.

The slag is located in a tilting furnace electrically heated by graphite or coal electrodes and having a discharge pipe extending down to the bottom of the furnace. The temperature of the slag is 1450° to 1800° C. Silicon is fed into the molten slag in a solid or liquid form. The ratio of amount of slag to amount of silicon used is preferably 1.6 to 3.2:1 parts by weight. After being fed into the slag the lumpy or small-sized silicon is converted to the molten state, thereby forming a liquid two-phase system with a bottom layer of molten silicon and molten slag floating on top.

After the silicon is liquefied the discharge is burned out and the furnace tilted about 10–17 angular degrees out of the horizontal position so that the liquid silicon under the slag layer can be removed via the discharge pipe. To the same extent as liquid silicon is removed, solid or liquid silicon is recharged to the tilted furnace. The liquid silicon removed via the discharge pipe hits a launder which collects it and retains any entrained slag, and further troughs for carrying off or cooling the liquid silicon. This liquid silicon is preferably sprayed at least partly and carried off by a sharp water jet or granulated and solidified with the aid thereof, or the silicon is poured into a preferably cooled oscillating conveyor trough lined with suitable materials.

It has surprisingly turned out that the liquid silicon can be sprayed on air with compressed air or preferably with an inert gas without large amounts of silicon burning, which would immediately lead to an intensive development of $SiO_2$ smoke. The liquid silicon can surprisingly be sprayed on air so easily that far greater smoke development can be detected when liquid silicon is tapped into tubs or ladles in the normal way.

It has proved to be very advantageous to spray silicon by means of compressed air and/or nitrogen to a drop size of about 1–10 mm over a trough with water flowing through it, the fusion heat of the silicon being quickly removed in the fast flowing cold water. This mode of operation avoids the danger of a hydrogen-oxygen reaction.

The obtained granular silicon is dried and then ground. It already has a grain size of 90% smaller than 10 mm, is irregular and very brittle so that this granular silicon can either be ground directly to the desired final fineness of e.g. smaller than 0.3 mm or smaller than 0.5 mm, or need only be sent through a fine crusher before grinding.

Despite its extremely quick cooling by being poured into water, the coarse-crushed or granulated silicon metal produced by the inventive process surprisingly shows no increased reactivity during silane synthesis compared to silicon slowly solidified in customary tubs, as described for atomized material in patent print DE 3 823 308. Unlike the silicon produced by the inventive process, the so-called atomized silicon of patent print DE 38 23 308 is directly atomized from the smelt to finenesses smaller than 500 microns with a preferred particle-size distribution of 30 to 300 microns. According to the inventive process the silicon is not to be atomized to grain sizes under 500 microns. The silicon produced according to patent print DE 38 23 308 is thus of a type different to the inventive material.

The inventive process saves the cost for crushing silicon plates. The cost of inventively granulating or coarse-crushing the silicon is a mere fraction of the cost of crushing silicon plates or blocks. Also, the granular silicon or small silicon plates or heap of solidified silicon drops obtained by the inventive process are virtually dust- and thus waste-free, while crushing silicon plates to a corresponding grain fineness gives rise to about 1 to 3% fine dust smaller than 70 microns as waste.

For continuously melting down silicon waste and/or silicon dust and continuously purifying the resulting liquid silicon on the basis of the inventive process (the melt-down furnace variant) the following slag composition has proved particularly advantageous:

| | |
|---|---|
| $K_2O$ | 2 to 10% by weight |
| $Na_2O$ | 0 to 2% by weight |
| $\Sigma\ K_2O + Na_2O$ | 2.5 to 10% by weight |
| $SiO_2$ | 62 to 72% by weight |
| $Al_2O_3$ | 0 to 10% by weight |
| $\Sigma\ SiO_2 + Al_2O_3$ | 64 to 75% by weight |
| CaO | 2 to 32% by weight |
| MgO | 2 to 32% by weight |
| $\Sigma$ CaO + MgO | 16 to 32% by weight |
| $\Sigma\ CaF_2 + MgF_2$ | max. 3% by weight |
| $\Sigma$ CaO + MgO + $CaF_2$ + $MgF_2$ | 16 to 32% by weight |

The preferred temperature in this process variant is between 1600° and 1700° C.

The described process can thus be used for example to recover superfine silicon dust arising as a waste product from the grinding of lumpy silicon to a low-dust grain, as a coarse-crushed starting product for silicon grains for fluid-bed furnaces for example.

When the process is employed to melt down silicon dust a 30 to 70% increase in melting efficiency is reached over the conventional mode of operation. At the same time the specific power consumption drops by about the same measure. The cost for melting down low-grade silicon dust likewise drops by this measure.

It is also within the scope of the invention to use the inventive process for continuously purifying molten silicon as arises for example as the tapping from a reduction furnace. To carry out this process variant (the refining furnace variant) one taps molten silicon for example from a reduction furnace into an inventive furnace. The inventive furnace contains a slag which is smelted and held by means of electric resistance heating. The temperature of the slag is preferably 1470° to 1570° C. The following slag composition has proven particularly advantageous for continuously refining liquid silicon produced for example in a reduction furnace on the basis of the inventive process:

| | |
|---|---|
| $K_2O$ | 1 to 10% by weight |
| $Na_2O$ | 0 to 5% by weight |
| $\Sigma\ K_2O + Na_2O$ | 2.5 to 10% by weight |
| $SiO_2$ | 62 to 72% by weight |
| $Al_2O_3$ | 0 to 10% by weight |
| $\Sigma\ SiO_2 + Al_2O_3$ | 64 to 75% by weight |
| CaO | 2 to 32% by weight |
| MgO | 2 to 32% by weight |
| $\Sigma$ CaO + MgO | 16 to 32% by weight |
| $\Sigma\ CaF_2 + MgF_2$ | max. 3% by weight |
| $\Sigma$ CaO + MgO + $CaF_2$ + $MgF_2$ | 16 to 32% by weight |

After being poured into the inventive furnace the liquid silicon collects below the slag layer and is freed from the impurities, aluminum and calcium, by reacting with the slag. By tilting the inventive furnace one preferably removes the refined silicon in the same amount as it is fed from the reduction furnace. The purifying operation takes place by the inventive process so fast that one pass of the silicon emerging continuously from the reduction furnace through the inventive refining furnace filled with slag suffices to reduce the silicon impurities, calcium and aluminum, to at least the same values as in the refining process with an oxygen/nitrogen mixture.

Should the aluminum content of the silicon smelt drop below the set value in the inventive melt-down or refining process it can be raised by continuous realloying. This can be done for example by coiling aluminum wire continuously into the discharge pipe of the inventive furnace. The aluminum wire melts in this discharge pipe in the swelling-up silicon and thereby dissolves. If necessary a stirring spool can be used to homogenize the aluminum in the liquid silicon.

The electric power fed to the refining furnace can be used to regulate the temperature of the refining slag and thus the pouring temperature of the silicon, which is likewise important for the continuous pouring operation to avoid overheating of the liquid silicon.

Overheated, liquid silicon attacks the cast iron lining of the oscillating conveyor troughs. It also increases the risk of an oxyhydrogen explosion when the liquid silicon is cooled in flowing water.

Further, up to about 10% silicon dust or silicon waste, based on the amount of liquid silicon produced in the reduction furnace, can be continuously added to the refining furnace and melted down during the refining process in accordance with the electric power of the inventive refining furnace.

In comparison to prior art refining processes in which combustion, slagging and splashing losses can be as high as 15% of the weight of the tapped silicon, the silicon losses in the inventive melting down and refining of silicon dust (melt-down furnace variant) are less than 4% by weight. In the inventive refining process in a carbothermic reduction furnace (refining furnace variant) they are in the range of only 0.5 to 2.5% by weight.

One difference between the described process variants is as follows. For melting down silicon or silicon dust one expediently uses furnaces with at least 2 MW of power in order to permit economical processing of the silicon dust, while when the process is used for purifying liquid silicon from a carbothermic silicon reduction furnace it suffices to use very small low-shaft furnaces with a relatively low smelting power of e.g. 0.3 to 0.6 MW to be able to process the amounts of liquid silicon produced in a silicon reduction furnace with the currently customary electric connect loads of 10 to 25 MW.

When the process is only used for purifying and continuously pouring the liquid silicon produced by a silicon reduction furnace one basically requires only the electric power necessary for premelting the slag and holding it.

BRIEF DESCRIPTION OF THE DRAWINGS

With reference to FIGS. 1 to 4 various embodiments of the inventive process will be explained in more detail by way of example.

FIGS. 1 and 2 show two embodiments of the melt-down furnace variant;

FIGS. 3 and 4 show two embodiments of the refining furnace variant.

DESCRIPTION OF THE PREFERRED EMBODIMENTS

FIG. 1: From melt-down furnace 1, with electrodes 3 immersed in slag 2, liquid silicon 5 flows continuously through discharge pipe 4 extending down to the bottom of the furnace onto launder 6 where it is collected and freed from entrained slag. The discharge pipe 4 further has a coiling aluminum wire 4a. The liquid silicon is then atomized by means of compressed nitrogen from nozzle 7 and conveyed in trough 8 with a sharp water jet from nozzle 9 via drain screen 10 into transport vat 11.

FIG. 2: From melt-down furnace 1 with electrodes 3 immersed in slag 2 liquid silicon 5 flows continuously through discharge pipe 4 extending down to the bottom of the furnace onto launder 6 where it is collected and freed from entrained slag. The liquid silicon is then atomized by means of compressed air from nozzle 7 and conveyed in air-cooled oscillating conveyor trough 12 lined with cast iron plates into transport vat 11.

FIG. 3: From the lip of silicon reduction furnace 13 the liquid silicon runs into refining furnace 14 and is then processed in the same way as the silicon from the melt-down furnace in FIG. 1.

FIG. 4: From the lip of silicon reduction furnace 13 the liquid silicon runs into refining furnace 14 and is then processed in the same way as the silicon from the melt-down furnace in FIG. 2.

The following examples will explain the invention further.

EMBODIMENT EXAMPLES

Example 1

In a tilting one-phase low-shaft furnace lined with coal tamping material, heated with two graphite electrodes with a diameter of 400 mm and having a graphite discharge pipe extending down to the bottom of an elliptic furnace tank, the furnace tank being 1.6 m wide, 2.4 m long and 1.1 m deep, 5 t slag with the following chemical analysis was melted down:

| | |
|---|---|
| $K_2O$ | 2.98% by weight |
| $Na_2O$ | 0.84% by weight |
| $SiO_2$ | 62.60% by weight |
| $Al_2O_3$ | 1.99% by weight |
| CaO | 18.98% by weight |
| MgO | 11.58% by weight | and impurities due to the raw materials.

The furnace was operated by immersing the electrodes in the liquid slag with an electric power of 2 MW. After the smelt was melted down and overheated to a temperature of about 1650° C. the charging of the silicon dust was begun. 2.5 t silicon dust was charged. After this amount of silicon dust was melted down the smelt was taken to about 1680° C. and the discharge then burned out by means of an electrode.

The furnace was now tilted about 13 angular degrees so that a partial amount of a few hundred kilograms of the liquid silicon located at the bottom of the furnace tank could rise up in the discharge pipe and flow out.

The furnace was left at this tilt and the charging of silicon dust begun again.

The effluent silicon was poured onto a launder which retained some slag that had risen up in the pipe during pouring. The silicon flowed down the launder and was atomized at the end of the launder by means of a nozzle out of which nitrogen flowed at a pressure of 5 bars. The glowing silicon drops fell into a trough in which cold water was flowing. They were picked up by the water jet and transported in the trough via a drain screen into a transport vat. From there they were conveyed into a dryer where they were freed from moisture. A granular silicon was obtained which had a grain size smaller than 10 mm. The bulk of the silicon grains had a diameter of 1 to 7 min. The granular material was then ground.

After 113 t silicon dust was melted down the furnace operation became unsteady, indicating that the slag was exhausted. The charging of silicon dust was now ended, the silicon poured completely out of the furnace and the entire slag then emptied into the slag tub.

The melt-down performance in the inventive process was 1.5 t silicon dust per hour. Customary batch processing only obtains an average melt-down performance of 0.9 t silicon dust per hour. The increase in melting performance in the inventive process over the prior art was thus 67%.

The yield was 97%, compared to a yield of 93% in the melting down in batches according to the prior art.

Example 2

In a tilting one-phase low-shaft furnace lined with coal tamping material and having an elliptic tank, the dimensions being a length of 100 cm, a width of 80 cm and a depth of 55 cm, 400 kg slag with the following chemical analysis was smelted by means of two graphite electrodes:

| | |
|---|---|
| $K_2O$ | 1.25% by weight |
| $Na_2O$ | 4.66% by weight |
| $SiO_2$ | 64.00% by weight |
| $Al_2O_3$ | 1.22% by weight |
| CaO | 17.79% by weight |
| MgO | 10.06% by weight | and impurities due to the raw materials.

This inventive refining furnace with an electric connect load of 0.5 MW was located below the discharge of a carbothermic silicon reduction furnace with an electric connect load of 15 MW which produced about 1 t silicon metal per hour.

The refining furnace was followed by a 1 m long launder which led to an oscillating conveyor trough lined with air-cooled cast iron plates. At the end of the 8 m long oscillating conveyor trough there was a transport vat into which the glowing silicon metal could fall.

After the abovementioned slag was completely smelted and heated in the refining furnace to 1530° C. the latter was filled about ⅔ with slag. The discharge aperture of the reduction furnace was now burned out.

The liquid silicon ran into the refining furnace in a uniform jet from the lip of the reduction furnace. Just before the tank of the refining furnace was filled with slag and silicon its discharge pipe was burned out by means of an electrode. The refining furnace was now tilted and silicon flowed onto the launder and from there onto the oscillating conveyor trough. Below the end of the launder there was a compressed-air nozzle which atomized the liquid silicon to a particle size of about 1–10 mm before it hit the oscillating conveyor trough. On the oscillating conveyor trough the silicon drops were cooled to the point that they no longer stuck together, i.e. they were surrounded on the outside with a layer of solidified silicon.

This silicon was caught in the transport vat at the end of the oscillating conveyor trough, where it could cool further. When a vat was full of silicon it was replaced by an empty vat and the silicon fed to the mill after complete cooling.

Approximately every 20 minutes about 30–40 kg silicon dust and/or silicon waste was added to the refining furnace. After 21 t liquid silicon was refined and 2 t waste silicon melted down the furnace operation became unsteady. The discharge aperture of the reduction furnace was now closed, the silicon and then the slag completely poured out.

A new slag was then smelted and the refining process could be continued.

The yield of refined silicon was 98.8%, based on unrefined silicon from the reduction furnace.

We claim:

1. A process for continuous treatment of silicon comprising the steps of:
    a) providing a tilting low-shaft furnace having a treatment tank therein and a discharge pipe communicating with an interior of said treatment tank;
    b) placing one end of said discharge pipe adjacent a bottom of said treatment tank such that said discharge pipe extends at an angle from the bottom of said treatment tank;
    c) inserting slag into said treatment tank;
    d) heating the slag in said treatment tank to a temperature of about 1450° C. to about 1800° C.;
    e) adding silicon in said treatment tank for at least one of melting said silicon and refining said silicon with said heated slag; and
    f) tilting said furnace such that said refined silicon flows through said discharge pipe and is discharged from said furnace.

2. A process of claim 1, wherein step e) comprises the further step of using solid silicon as said silicon added to said treatment tank, subsequent to heating said slag, and melting said silicon with said heated slag.

3. A process of claim 1, wherein step e) comprises the further step of using liquid silicon as said silicon added to said treatment tank subsequent to heating said slag.

4. A process of claim 1, further comprising the step of, following discharge of said silicon from said furnace, pouring said silicon into a water jet thereby solidifying said silicon into a coarse form.

5. A process according to claim 1, further comprising the step of, following discharge of said silicon from said furnace, spraying said silicon into a water jet thereby solidifying said silicon into a coarse form.

6. A process of claim 5, wherein the spraying step further comprises using one of compressed air and nitrogen to spray said silicon.

7. A process of claim 1, further comprising the step of, following discharge of said silicon from said furnace, pouring said silicon onto an oscillating conveyor thereby to solidify said silicon into a coarse form.

8. A process of claim 1, further comprising the step of, following discharge of said silicon from said furnace, spraying said silicon onto an oscillating conveyor thereby to solidify said silicon into a coarse form.

9. A process according to claim 8, further comprising the step of, following discharge of said silicon from said furnace, spraying said silicon into a water jet thereby solidifying said silicon into a coarse form.

10. A process of claim 1, further comprising the step of using the following composition:

| | |
|---|---|
| $K_2O$ | 0 to 15% by weight |
| $Na_2O$ | 0 to 10% by weight |
| $\Sigma\ K_2O + Na_2O$ | 2 to 15% by weight |
| $SiO_2$ | 55 to 72% by weight |
| $Al_2O_3$ | 0 to 15% by weight |
| $\Sigma\ SiO_2 + Al_2O_3$ | 60 to 78% by weight |
| CaO | 0 to 35% by weight |
| MgO | 0 to 35% by weight |
| $\Sigma\ CaO + MgO$ | 15 to 35% by weight |
| $CaF_2$ | 0 to 8% by weight |
| $MgF_2$ | 0 to 8% by weight |
| $\Sigma\ CaF_2 + MgF_2$ | 0 to 8% by weight |
| $\Sigma\ CaO + MgO + CaF_2 + MgF_2$ | 15 to 32% by weight | as said slag.

11. A process for continuous treatment of silicon comprising the steps of:
    a) providing a tilting low-shaft furnace defining a treatment chamber therein and having a discharge pipe located adjacent and extending at an angle up from a bottom of the treatment chamber;
    b) placing a coiled aluminum wire inside the discharge pipe;
    c) inserting slag into said treatment chamber;
    d) heating the slag in said chamber to a temperature of about 1450° C. to about 1800° C.;
    e) adding silicon in said chamber for refining said silicon with said heated slag; and
    f) tilting said furnace such that said refined silicon flows through the discharge pipe and is discharged from said furnace.

12. An apparatus for continuous treatment of silicon comprising:
    a) a tilting low-shaft furnace having a treatment tank therein and a discharge pipe communicating with an interior of said treatment tank;

b) one end of said discharge pipe being located adjacent a bottom of said treatment tank such that said discharge pipe extends at an angle from the bottom of said treatment tank;
c) means for heating slag, added to said treatment tank, to a temperature of about 1450° C. to about 1800° C.;
d) and means for tilting said furnace such that refined silicon flows through said discharge pipe and is discharged from said furnace;

whereby when slag is added to said treatment tank and heated in said treatment tank to a temperature of about 1450° C. to about 1800° C. and when silicon is added to said treatment tank, said silicon is at least one of melted and refined by said heated slag and said refined silicon flows through said discharge pipe and is discharged from said furnace.

* * * * *